United States Patent
Bedard et al.

(10) Patent No.: US 11,301,036 B1
(45) Date of Patent: Apr. 12, 2022

(54) METHOD AND DEVICE FOR IMAGE DISPLAY AND EYE TRACKING THROUGH A CATADIOPTRIC LENS

(71) Applicant: Apple Inc., Cupertino, CA (US)

(72) Inventors: Noah D. Bedard, Pacifica, CA (US);
Branko Petljanski, San Jose, CA (US);
John N. Border, Campbell, CA (US);
Kathrin Berkner-Cieslicki, Los Altos, CA (US); Qiong Huang, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 448 days.

(21) Appl. No.: 16/015,769

(22) Filed: Jun. 22, 2018

Related U.S. Application Data

(60) Provisional application No. 62/564,896, filed on Sep. 28, 2017.

(51) Int. Cl.
| | | |
|---|---|---|
| *G06F 3/01* | (2006.01) | |
| *G02B 17/08* | (2006.01) | |
| *G02B 27/01* | (2006.01) | |
| *G02B 27/14* | (2006.01) | |
| *H04N 5/33* | (2006.01) | |
| *G02B 27/28* | (2006.01) | |

(52) U.S. Cl.
CPC .......... *G06F 3/013* (2013.01); *G02B 17/0856* (2013.01); *G02B 27/0172* (2013.01); *G02B 27/141* (2013.01); *G02B 27/286* (2013.01); *H04N 5/33* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 8,824,779 B1* | 9/2014 | Smyth | G06T 7/593 |
| | | | 382/154 |
| 2014/0361957 A1* | 12/2014 | Hua | G02B 27/0093 |
| | | | 345/8 |
| 2017/0336609 A1* | 11/2017 | Lerner | G02B 21/22 |
| 2018/0275409 A1* | 9/2018 | Gao | H04N 13/344 |

* cited by examiner

*Primary Examiner* — Heather R Jones
(74) *Attorney, Agent, or Firm* — Fernando & Partners, LLP

(57) ABSTRACT

In one implementation, an apparatus includes a display to emit light in a first wavelength range, a camera to detect light in a second wavelength range, an eyepiece to distort light in the first wavelength range, and one or more light sources, disposed between the eyepiece and the display, to emit light in the second wavelength range. In one implementation, an apparatus includes a display to emit light in a first wavelength range, one or more light sources to emit light in a second wavelength range, a camera to detect light in a second wavelength range, and an eyepiece to reflect and refract light in the first wavelength range while passing, without substantial distortion, light in the second wavelength range.

22 Claims, 12 Drawing Sheets

METHOD AND DEVICE FOR IMAGE DISPLAY AND EYE TRACKING THROUGH A CATADIOPTRIC LENS

CROSS-REFERENCE TO RELATED APPLICATION

This application claims priority to U.S. Provisional Patent App. 62/564,896, filed on Sep. 28, 2017, which is hereby incorporated by reference in its entirety.

TECHNICAL FIELD

The present disclosure generally relates to virtual reality and augmented reality head-mounted devices, and in particular, to systems, methods, and devices for displaying an image and tracking an eye of a user through a catadioptric lens.

BACKGROUND

Head-mounted devices (HMDs) generally include a display and an eyepiece that makes the display appear to the user to be at a virtual distance farther than the actual distance from the eye to the display. However, in many circumstances, the actual distance needed with a standard refractive lens causes the size of the HMD to be unwieldy for mounting on the head of the user. In various implementations, an eye tracking system is included in the HMD to augment the viewing experience, potentially increasing the size of the HMD further.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
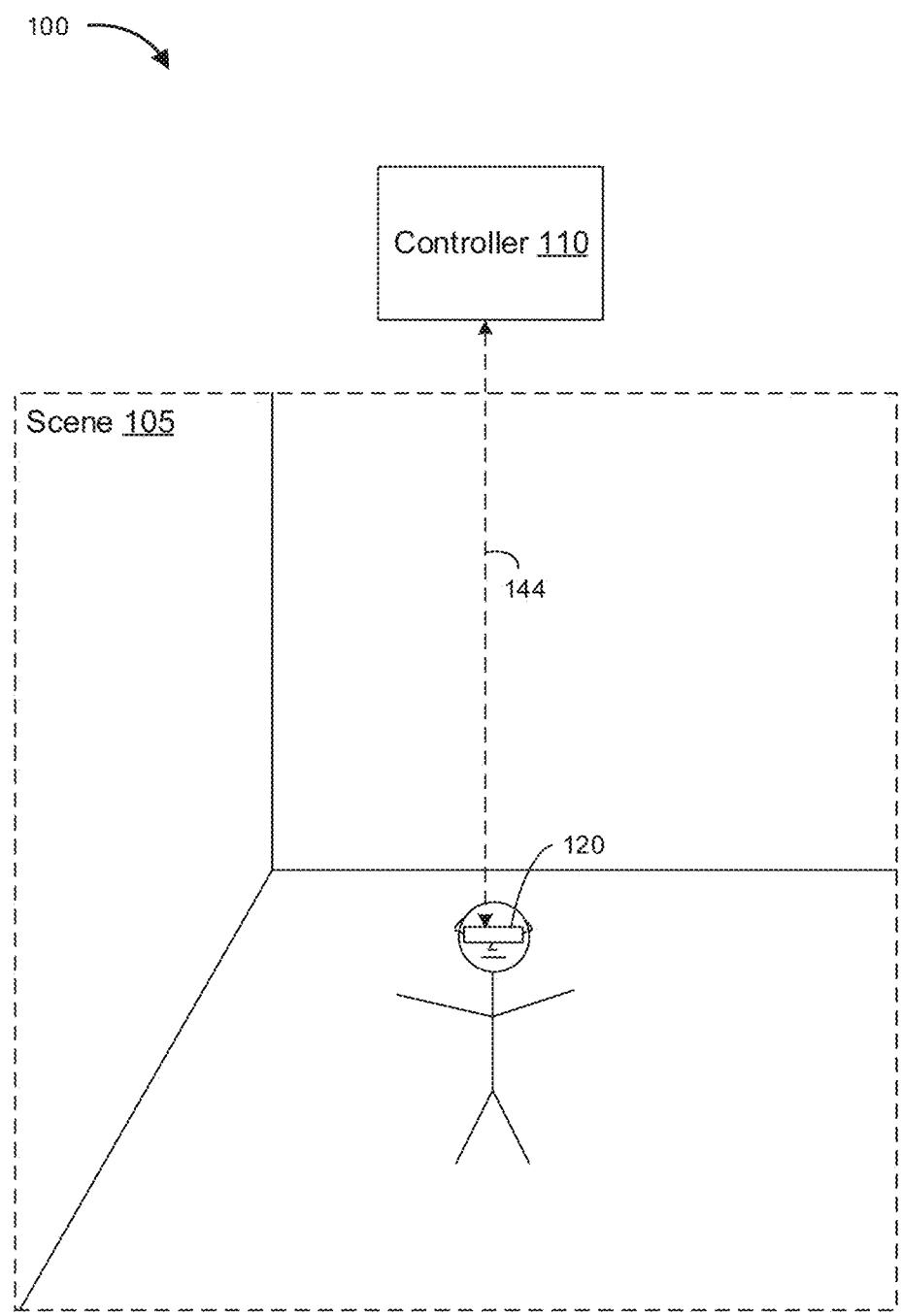
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for image display and eye tracking through a catadioptric lens. In some implementations, an apparatus includes a display to emit light in a first wavelength range and a camera to detect light in a second wavelength range. The apparatus includes an eyepiece to distort light in the first wavelength range and one or more light sources, disposed between the eyepiece and the display, to emit light in the second wavelength range.

In some implementations, an apparatus includes a display to emit light in a first wavelength range, one or more light sources to emit light in a second wavelength range, and a camera to detect light in a second wavelength range. The apparatus further comprises an eyepiece to reflect and refract light in the first wavelength range while passing, without substantial distortion, light in the second wavelength range.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In order to reduce the actual distance between the eye of a user and a display in an HMD, while maintaining a virtual distance that can be easily accommodated by the eye, an eyepiece including a catadioptric lens can be used. A catadioptric lens folds the light path such that a ratio of the virtual distance to the actual distance is much greater than with a simply refractive lens.

When an eyepiece with a catadioptric lens is used in an HMD, and the display is moved closer to the eyepiece (and, thus, the eye), little room remains between the eyepiece and the display, making it difficult to fit an eye tracking system, such as one or more light sources and a camera. However, using a selectively distortive catadioptric lens (that distorts light from the display but does not distort light from the light sources) allows the eye tracking system to be placed very near the eyepiece without experiencing distortion from the eyepiece.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some embodiments, the controller 110 is configured to manage and coordinate an augmented reality/virtual reality (AR/VR) experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some embodiments, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some embodiments, the HMD 120 is configured to present the AR/VR experience to the user. In some embodiments, the HMD 120 includes a suitable combination of software, firmware, and/or hardware. The HMD 120 is described in greater detail below with respect to FIG. 3. In some embodiments, the functionalities of the controller 110 are provided by and/or combined with the HMD 120.

According to some embodiments, the HMD 120 presents an augmented reality/virtual reality (AR/VR) experience to the user while the user is virtually and/or physically present within the scene 105. In some embodiments, while presenting an augmented reality (AR) experience, the HMD 120 is configured to present AR content and to enable optical see-through of the scene 105. In some embodiments, while presenting a virtual reality (VR) experience, the HMD 120 is configured to present VR content and to enable video pass-through of the scene 105.

In some embodiments, the user wears the HMD 120 on his/her head. As such, the HMD 120 includes one or more AR/VR displays provided to display the AR/VR content. For example, in various implementations, the HMD 120 encloses the field-of-view of the user. In some embodiments, the HMD 120 is replaced with a handheld device (such as a smartphone or tablet) configured to present AR/VR content in which the user does not wear the HMD 120, but holds the device with a display directed towards the field-of-view of the user and a camera directed towards the scene 105. In some embodiments, the HMD 120 is replaced with an AR/VR chamber, enclosure, or room configured to present AR/VR content in which the user does not wear or hold the HMD 120.

Figure 2:
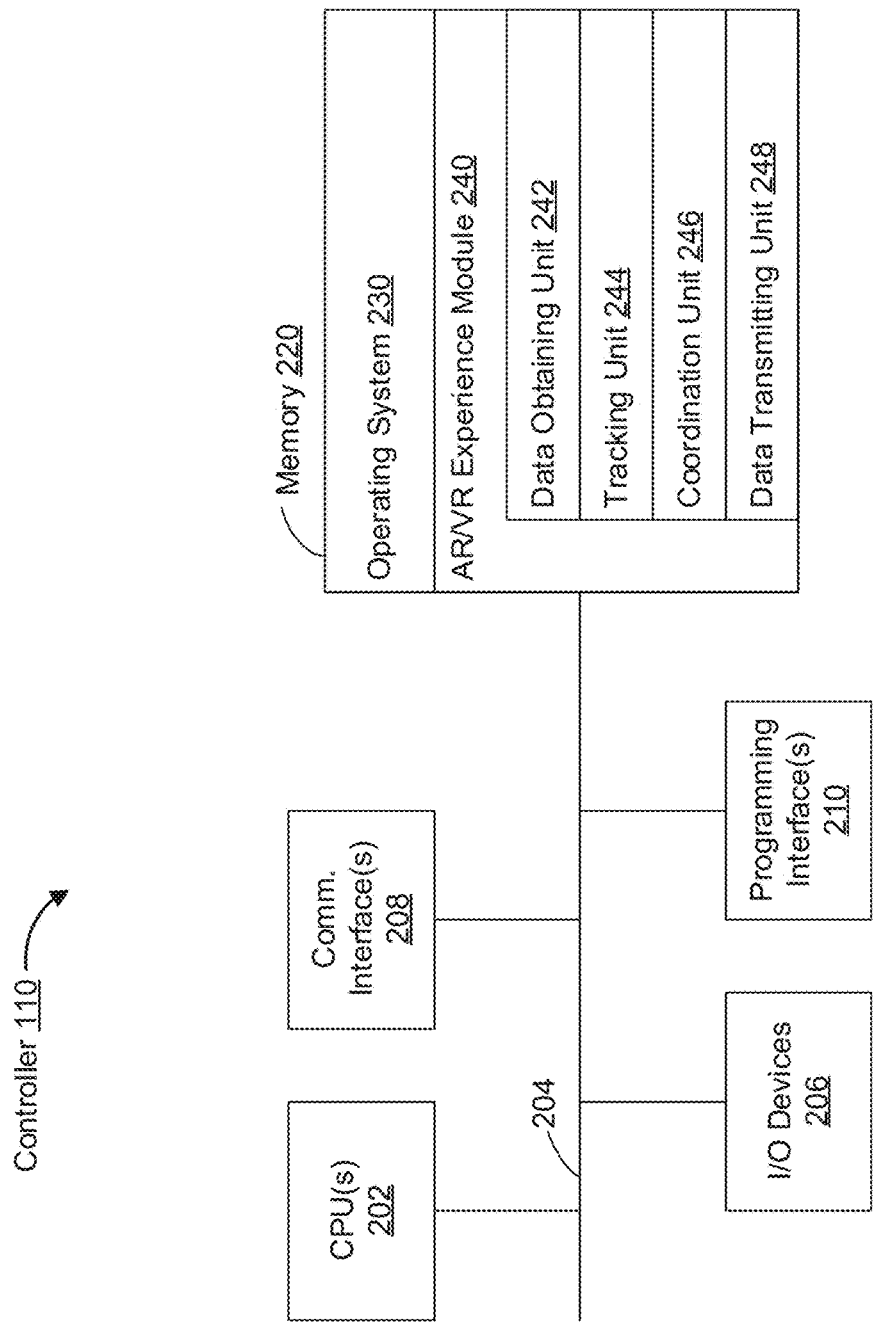
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 is configured to manage and coordinate one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the AR/VR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
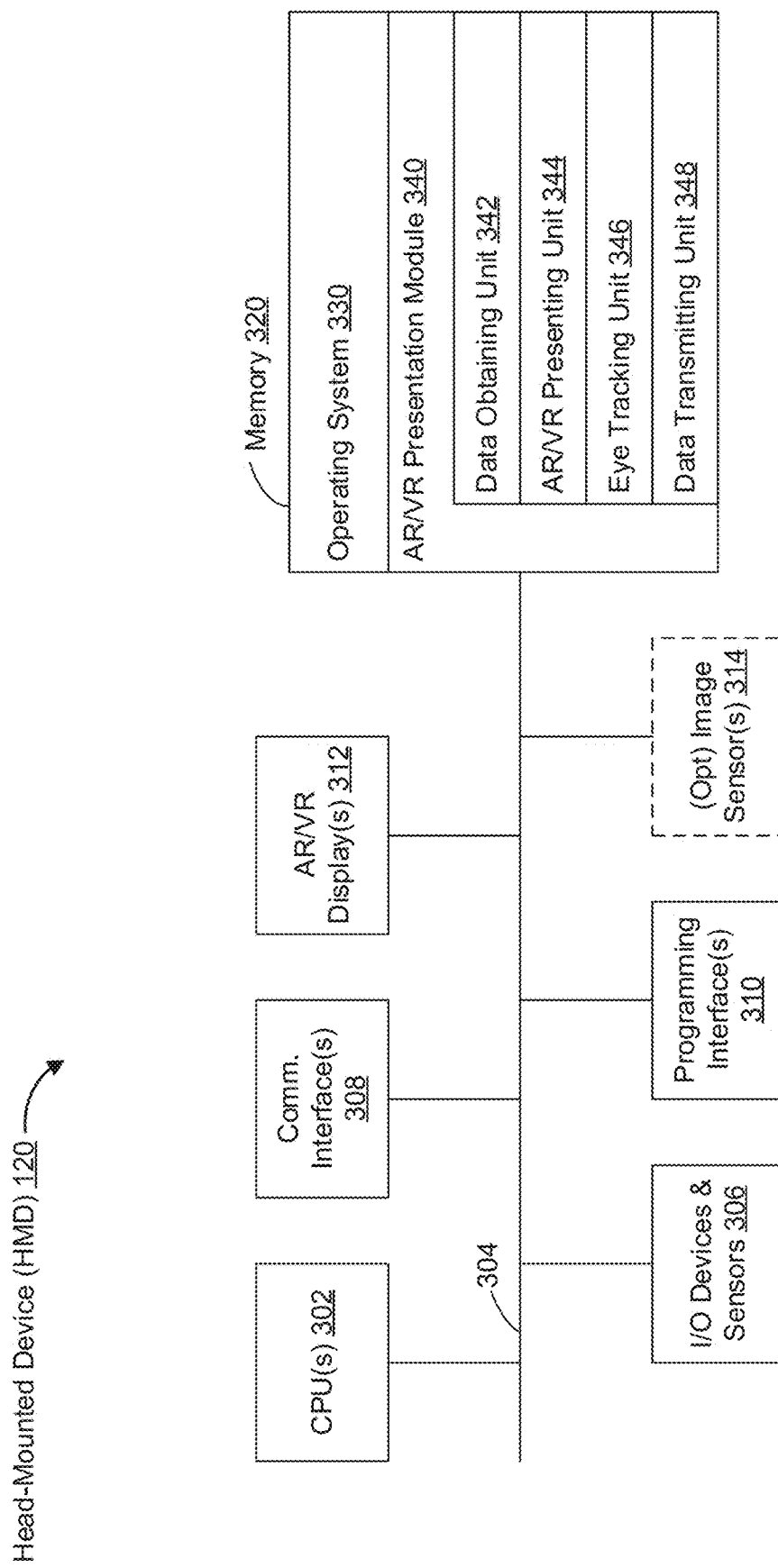
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more AR/VR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more AR/VR displays 312 are configured to present the AR/VR experience to the user. In some embodiments, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more AR/VR displays 312 correspond to diffractive, reflective, polarized, holographic, etc. waveguide displays. For example, the HMD 120 includes a single AR/VR display. In another example, the HMD 120 includes an AR/VR display for each eye of the user. In some embodiments, the one or more AR/VR displays 312 are capable of presenting AR and VR content. In some embodiments, the one or more AR/VR displays 312 are capable of presenting AR or VR content.

In some implementations, the one or more optional image sensors 314 are configured to obtain image data that corresponds to at least a portion of the face of the user that includes the eyes of the user. For example, the one or more optional image sensors 314 correspond to one or more RGB camera (e.g., with a complimentary metal-oxide-semiconductor (CMOS) image sensor or a charge-coupled device (CCD) image sensor), IR camera, event-based camera, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an AR/VR presentation module 340.

The operating system 330 includes procedures for handling various basic system services and for performing hardware dependent tasks. In some implementations, the AR/VR presentation module 340 is configured to present AR/VR content to the user via the one or more AR/VR displays 312. To that end, in various implementations, the AR/VR presentation module 340 includes a data obtaining unit 342, an AR/VR presenting unit 344, an eye tracking unit 346, and a data transmitting unit 348.

In some implementations, the data obtaining unit 342 is configured to obtain data (e.g., presentation data, interaction data, sensor data, location data, etc.) from at least o the controller 110. To that end, in various implementations, the data obtaining unit 342 includes instructions and/or logic therefor, and heuristics and metadata therefor.

In some implementations, the AR/VR presenting unit 344 is configured to present AR/VR content via the one or more AR/VR displays 312. To that end, in various implementations, the AR/VR presenting unit 344 includes instructions and/or logic therefor, and heuristics and metadata therefor. In some implementations, the AR/VR presenting unit 344 is configured to projecting an image comprising emitted light in a first wavelength range through an eyepiece that distorts light in the first wavelength range. In some embodiments, the AR/VR presenting unit 344 is configured to project an image comprising emitted light in a first wavelength through an eyepiece that reflects and refracts light in the first wavelength range while passing, without substantial distortion, light in the second wavelength range.

In some implementations, the eye tracking unit 346 is configured to emit, using one or more light sources disposed between the eyepiece and the display, light in a second wavelength range and detect, using a camera, the light in the second wavelength range. In various implementations, the one or more light sources illuminate the eye of a user and the camera detect light reflected from the eye of the user. To that end, in various implementations, the eye tracking unit 346 includes instructions and/or logic therefor, and heuristics and metadata therefor. In some implementations, the eye tracking unit 346 is configured to emitting light in a second wavelength range through the eyepiece and detecting the light in the second wavelength range reflected by the eye of a user.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the AR/VR presenting unit 344, the eye tracking unit 346, and the data transmitting unit 348 are shown as residing on a single device (e.g., the HMD 120), it should be understood that in other implementations, any combination of the data obtaining unit 342, the AR/VR presenting unit 344, the eye tracking unit 346, and the data transmitting unit 348 may be located in separate computing devices.

Moreover, FIG. 3 is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
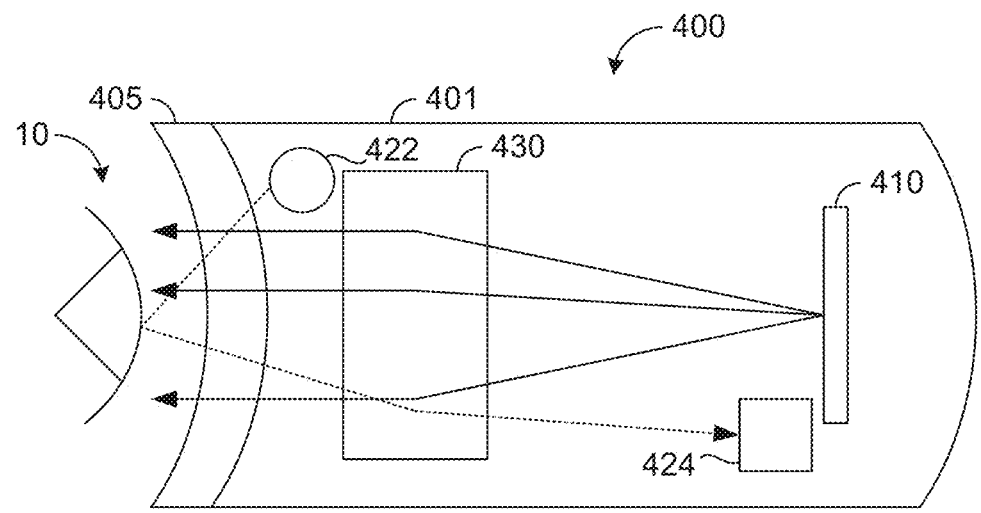
FIG. 4 illustrates a block diagram of a head-mounted device in accordance with some implementations.

FIG. 4 illustrates a block diagram of a head-mounted device 400 in accordance with some implementations. The head-mounted device 400 includes a housing 401 (or enclosure) that houses various components of the head-mounted device 400. The housing 401 includes (or is coupled to) an eye pad 405 disposed at a proximal (to the user 10) end of the housing 401. In various implementations, the eye pad 405 is a plastic or rubber piece that comfortably and snugly keeps the head-mounted device 400 in the proper position on the face of the user 10 (e.g., surrounding the eye of the user 10).

The housing 401 houses a display 410 that projects an image, through an eyepiece 430, onto the eye of a user 10. The eyepiece 430 refracts light emitted by the display 410, making the display appear to the user 10 to be at a virtual distance further than the actual distance from the eye to the display 410. For the user to be able to focus on the display 410, in various implementations, the virtual distance is at least greater than a minimum focal distance of the eye (e.g., 7 cm). Further, in order to provide a better user experience, in various implementations, the virtual distance is greater than 1 m.

For example, in one embodiment, the distance from the eye to the eyepiece 430 is approximately 15 mm, the eyepiece 430 is approximately 8 mm thick, and the distance between the eyepiece 430 and the display 410 is approximately 38 mm Thus, the distance from the eye to the display 410 is approximately 61 mm. However, the eyepiece 430 refracts the light emitted by the display 410 to provide a virtual distance of approximately 2 m.

The housing 401 also houses an eye tracking system including one or more light sources 422 and a camera 424. The one or more light sources 422 project, onto the eye of the user 10, a light pattern (e.g., a circle of glints) that can be detected by the camera 424. Based on the light pattern, reflected by the eye of the user 10 and detected by the camera 424, the relative position of the eye of the user 10 can be tracked. For example, a gaze direction of the user 10 can be determined.

In various implementations, eye tracking (or, in particular, the determined gaze direction) is used to enable user interaction (e.g., the user 10 selects an option on the display 410 by looking at it), provide foveated rendering (e.g., present a higher resolution in an area of the display 410 the user 10 is looking at and a lower resolution elsewhere on the display 410), or reduce geometric distortion (e.g., in 3D rendering of objects on the display 410).

The display 410 emits light in a first wavelength range and the one or more light sources 422 emit light in a second wavelength range. Similarly, the camera 424 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm). In the head-mounted device 400 of FIG. 4, the eyepiece 430 refracts light in both the first wavelength range and the second wavelength range.

In various implementations, the camera 424 is disposed to have a frontal view of the eye of the user 10, thereby minimizing distortion and ensuring the pupil of the eye is visible for accurate eye tracking. Thus, in various implementations, the camera 424 is disposed between the eyepiece 430 and the display 410. In various implementations, the one or more light sources 422 are disposed between the eye and the eyepiece 430.

Figure 5:
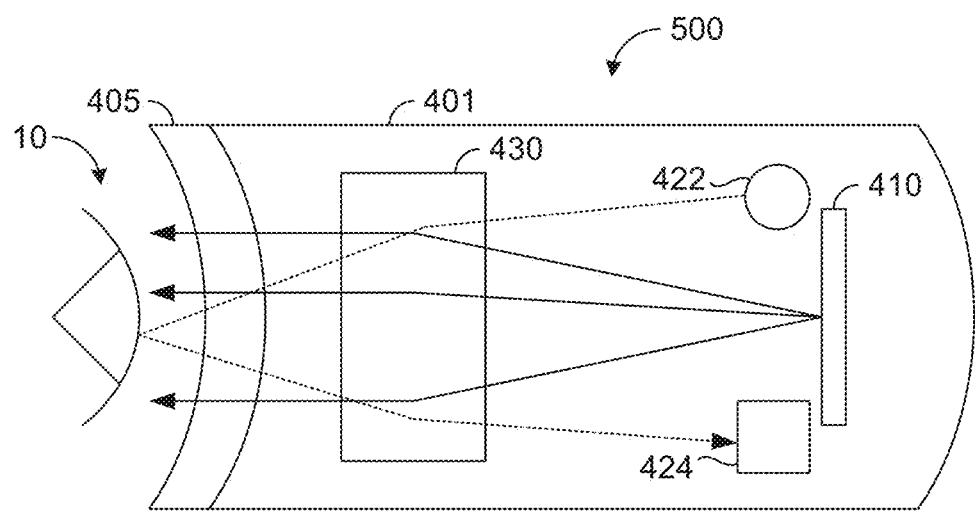
FIG. 5 illustrates a block diagram of a head-mounted device having one or light sources disposed between the eyepiece and the display in accordance with some implementations.

FIG. 5 illustrates a block diagram of a head-mounted device 500 having one or more light sources 422 disposed between the eyepiece 430 and the display 410 in accordance with some implementations. The head-mounted device 500 of FIG. 5 is substantially similar to the head-mounted device 400 of FIG. 4, except that, in the head-mounted device 500 of FIG. 5, the one or more light sources 422 are disposed between the eyepiece 430 and the display 410. In particular, in various implementations, the one or more light sources 422 are disposed closer to the display than to the eyepiece 430.

Because the one or more light sources 422 are disposed between the eyepiece 430 and the display 410 (and further from the eyepiece 430 than the focal length in at least the first wavelength range), light emitted by the one or more light sources 422 is collimated by the eyepiece 430 and appears out-of-focus in the image of the eye detected by the camera 424, thereby reducing eye tracking accuracy. Further, because the eyepiece 430 increases the virtual distance between the eye and the one or more light sources 422, the user 10 is able focus on the one or more light sources 122, potentially causing retinal damage.

Figure 6:
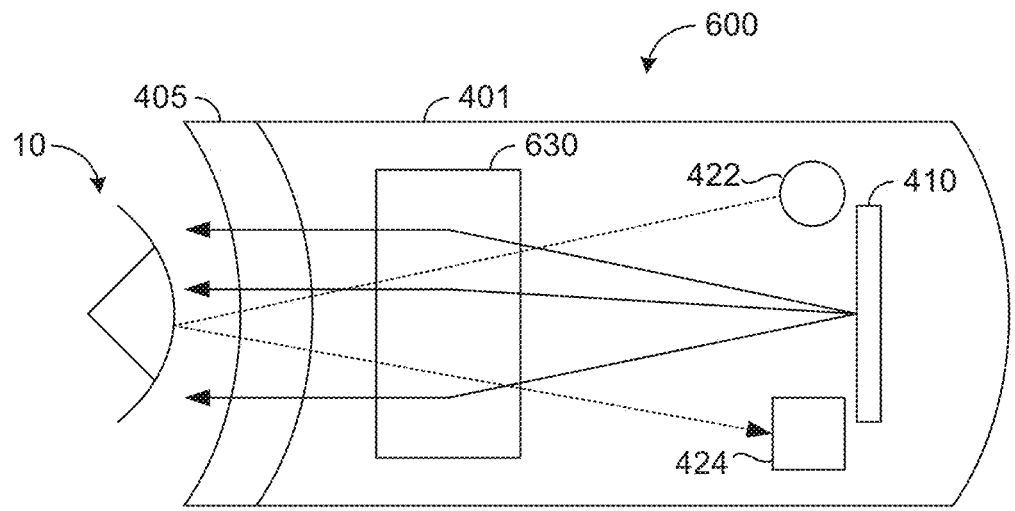
FIG. 6 illustrates a block diagram of a head-mounted device having a selectively distortive eyepiece in accordance with some implementations.

FIG. 6 illustrates a block diagram of a head-mounted device 600 having a selectively distortive eyepiece 630 in accordance with some implementations. The head-mounted device 600 of FIG. 6 is substantially similar to the head-mounted device 500 of FIG. 5, except that, in the head-mounted device 600 of FIG. 6, the eyepiece 630 refracts light in the first wavelength range while passing, without substantially distortion, light in the second wavelength range. Accordingly, the eyepiece 630 increases the virtual distance from the eye to the display 410 without affecting the virtual distance from the eye to the one or more light sources 422 or the camera 424.

Accordingly, the one or more light sources 422 are disposed in the head-mounted display 600 closer to the optical axis than their position in the head-mounted display of FIG. 4, thereby improving detectability by the camera 424 and localization by the eye tracking system. Further, light emitted by the one or more light sources 422 is not collimated by the eyepiece 630 as is the case in the head-mounted device 500 of FIG. 5. Further, because the eyepiece 630 does not increase the virtual distance between the eye and the one or more light sources 422, the user 10 cannot focus on the one or more light sources 422 as is the case in the head-mounted device 500 of FIG. 5.

In order to reduce the form factor of the head-mounted device 600 (e.g., the size of the housing 401), in various implementations, the display 410 is brought closer to the eyepiece 630 and, thus, the eye of the user 10. In various implementations, an eyepiece that simply refracts light is unable to provide a sufficient virtual distance when the actual distance between the eyepiece 630 and the display 410 is reduced. Accordingly, in various implementations, a catadioptric eyepiece that both refracts and reflects light is used.

Figure 7:
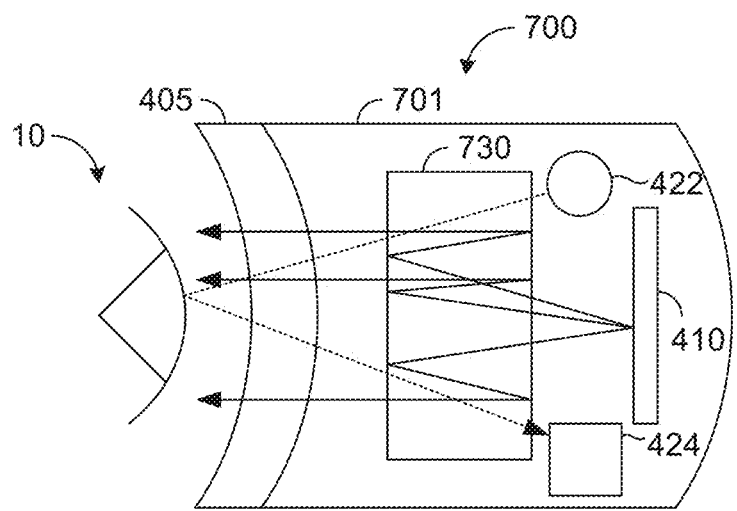
FIG. 7 illustrates a block diagram of a head-mounted device having a catadioptric eyepiece in accordance with some implementations.

FIG. 7 illustrates a block diagram of a head-mounted device 700 having a catadioptric eyepiece 730 in accordance with some implementations. The head-mounted device 700 of FIG. 7 is substantially similar to the head-mounted device 600 of FIG. 6, except that, in the head-mounted device 700 of FIG. 7, the eyepiece 730 includes a selectively distortive catadioptric lens that reflects and refracts light in the first wavelength range while passing, without substantial distortion, light in the second wavelength range and, in the head-mounted device 700 of FIG. 7, the size of the housing 701 is reduced, with the display 410 (and the eye tracking system) closer to the eyepiece 730. For example, in various implementations, the distance between the eyepiece 730 and the display 410 is between 0 and 3 mm. However, because, in various implementations, the selectively distortive catadioptric lens folds the optical path of light rays in the first wavelength range, the virtual distance between the eye and the display 410 is still approximately 2 m.

In various implementations, the selectively distortive catadioptric lens is a split meniscus lens including two lens halves separated by a quarter-wave retarder. In various implementations, the quarter-wave retarder includes a quarter-wave plate or another birefringent material that retards by a quarter-wave. Thus, the eyepiece 730 passes, without substantial distortion, light in the second wavelength range, and the image of the eye detected by the camera 424 has less distortion than if the eyepiece 730 reflected and refracted light in the second wavelength range. Further, in various implementations, the eye tracking system is hidden from the view of the user 10 with the one or more light sources 422 and/or camera 424 disposed out of the field of view in the first wavelength range of the eyepiece 730 (while being in the field of view in the second wavelength range of the eyepiece 730).

Figure 8:
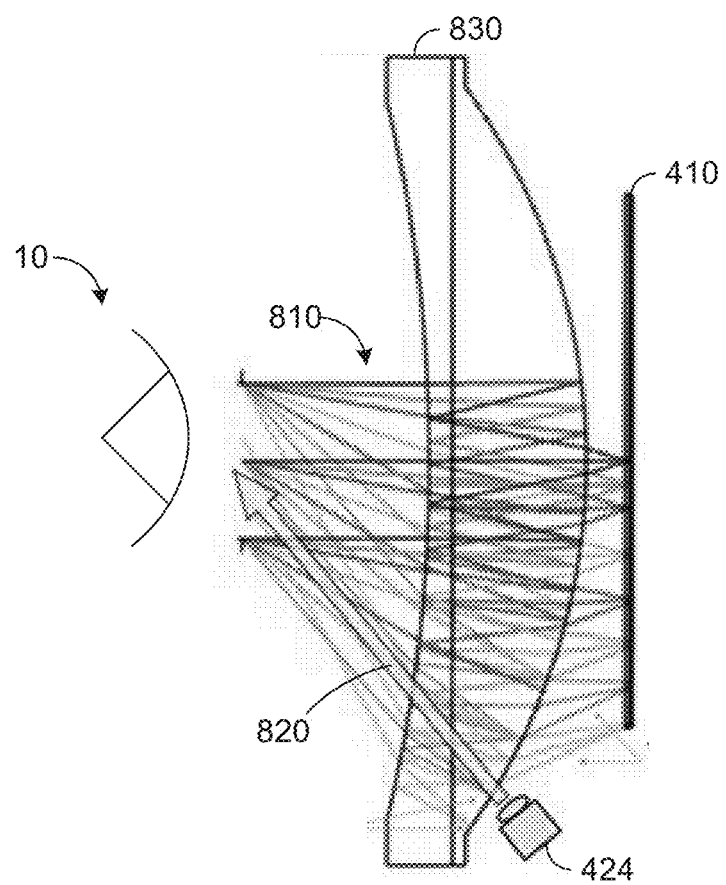
FIG. 8 is a ray-trace diagram of light emitted from a display towards the eye of a user through a selectively distortive split meniscus lens.

FIG. 8 is a ray-trace diagram of light emitted from a display 410 towards the eye of a user 10 through a selectively distortive split meniscus lens 830. The selectively distortive split meniscus lens 830 includes two lens halves separated by a quarter-wave retarder. In various implementations, The lens halves and quarter-wave retarder can be adhesively bonded together as shown in FIG. 8 or separated with air gaps between one or more of the lens elements. Visible light rays 810 are reflected and refracted by the selectively distortive split meniscus lens 830, whereas near-infrared rays 820 pass through the selectively distortive split meniscus lens 830 without substantial distortion. Accordingly, the camera 424 cannot be seen in the visible spectrum by the user. With a gaze direction towards the camera 424, the user sees the bottom of the display 410 (as indicated by the lowermost visible light rays 810). Accordingly, the camera 424 is hidden from the view of the user 10.

Figure 9:
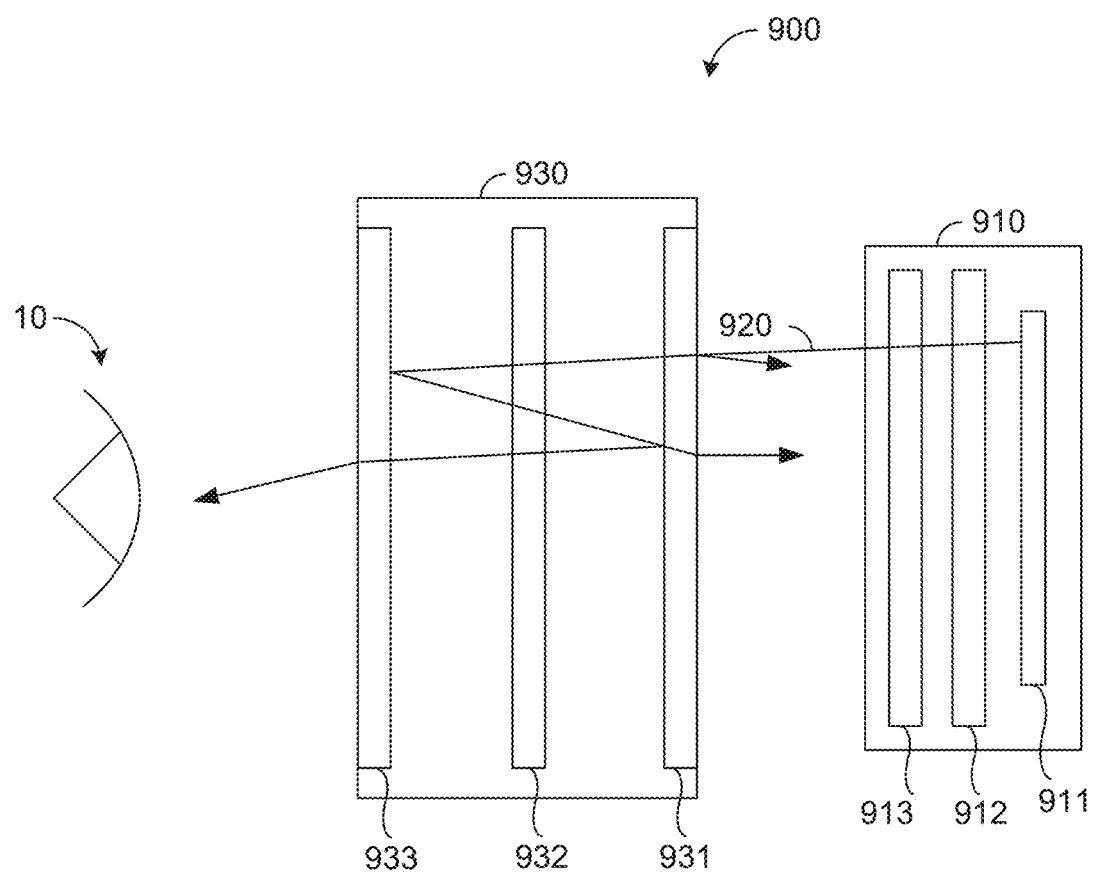
FIG. 9 is a functional block diagram of an optical system including a split meniscus lens in accordance with some implementations.

FIG. 9 is a functional block diagram of an optical system 900 including a split meniscus lens 930 in accordance with some implementations. The optical system 900 includes a display 910 that projects an image through the split meniscus lens 930 to the eye of a user 10.

The display 910 includes a light emitter 911, such as an array of LEDs, that emits light 920 in the first wavelength range. The display 910 includes a linear polarizer 912 that linear polarizes the light 920. The display 910 includes a quarter-wave retarder 913 that changes linearly polarized light into circularly polarized light. Accordingly, the light 920 emitted by the display 610 is circularly polarized with a first circular orientation (also referred to as a handedness or polarization). In various implementations, elements described herein that circularly polarize light can also elliptically polarize light.

The circularly polarized light 920 strikes a partially reflective, partially transmissive (PR/PT) surface 931 of the split meniscus lens 930. In various implementations, the PR/PT surface 931 is a 50/50 mirror, which is 50% reflective and 50% transmissive within the first wavelength range.

Accordingly, a portion of the circularly polarized light 920 is reflected off the PR/PT surface 931 back towards the display 931 and a portion of the circularly polarized light 920 refracts (based on the geometry of the PR/PT surface 931 and relative refractive indexes) into the split meniscus lens 930. The refracted portion of the circularly polarized light 920 passes through a quarter-wave retarder 932 that changes the circularly polarized light to linearly polarized light. Accordingly, after passing through the quarter-wave retarder 932, the light 920 is linearly polarized in a first linear orientation (in either the same linear orientation as previously after passing through the linear polarizer 912 or an orthogonal linear orientation).

The light 920, having passed through the quarter-wave retarder 932, encounters a reflective polarizer 933 that reflects linearly polarized light of the first linear orientation and transmits linearly polarized light of a second linear orientation orthogonal to the first linear orientation. Because the light 920 is linearly polarized in the first linear orientation, the light 920 reflects off the reflective polarizer 933 back towards the quarter-wave retarder 932. The light 920 then passes through the quarter-wave retarder 932 a second time becoming circularly polarized in the first circular orientation (e.g., the same circular orientation that the light 920 had when it entered the split meniscus 930). The light 920 encounters the PR/PT surface 931 and one portion of the light 920 is emitted from the split meniscus lens 930 back towards the display 910 while another portion of the light 920 is reflected back towards the quarter-wave retarder 932. In reflecting off the PR/PT surface 931, the circular orientation of the light 920 is changed to a second circular orientation opposite the first orientation. The portion of the light 920 that is reflected back towards the quarter-wave retarder 932 passes through the quarter-wave retarder 932 a third time and, having the second circular orientation entering the quarter-wave plate 932, becomes linearly polarized in the second linear orientation. Thus, being linearly polarized in the second linear orientation, the portion of light 920 passes through the reflective polarizer 933 out of the split meniscus lens 930 towards the eye of the user 10, being refracted according the geometry of the reflective polarizer 933 and the relative refractive indexes.

Figure 10A:
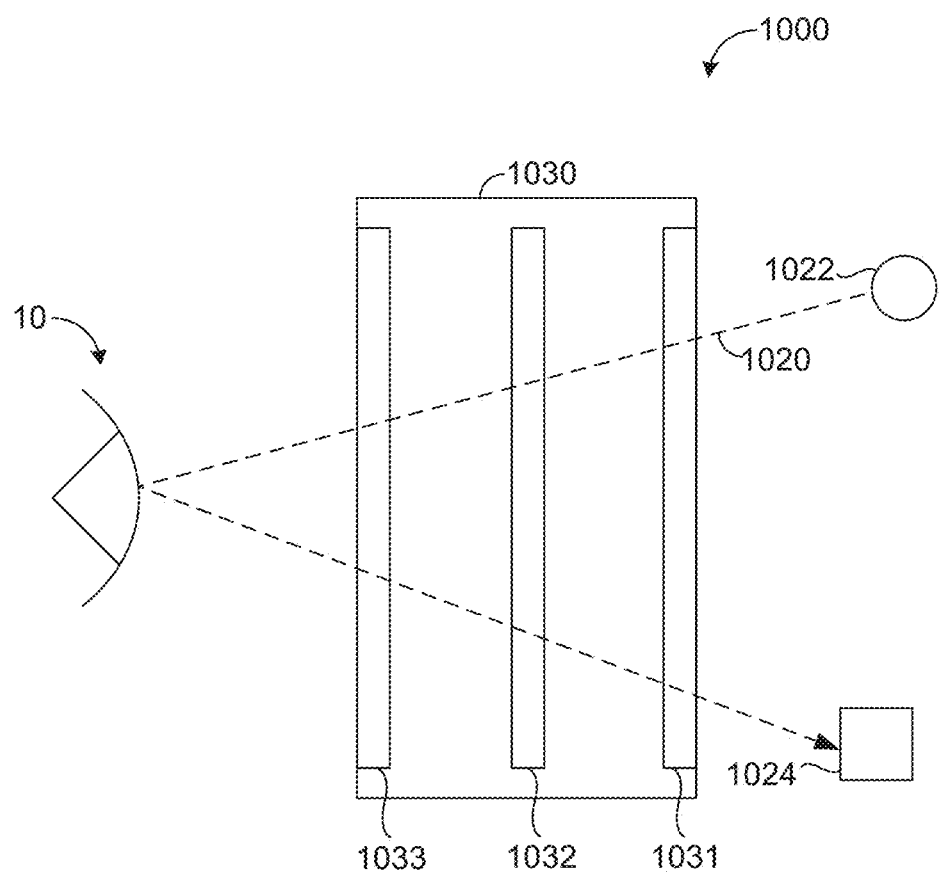
FIG. 10A is a functional block diagram of an optical system including a selectively distortive split meniscus lens in accordance with some implementations.

FIG. 10A is a functional block diagram of an optical system 1000 including a selectively distortive split meniscus lens 1030 in accordance with some implementations. The optical system 1000 includes one or more light sources 1022 that emit light 1020 in a second wavelength range and a camera 1024 that detects light 1020 in the second wavelength range.

In various implementations, the selectively distortive split meniscus lens 1030 includes a PR/PT surface 1031, a quarter-wave retarder 1032, and a reflective polarizer 1033 which operate, in the first wavelength range, as described above with respect to the split meniscus lens 930, the PR/PT surface 931, the quarter-wave retarder 932, and the reflective polarizer 933 of FIG. 9. However, in the second wavelength range, the PR/PT surface 1031, the quarter-wave retarder 1032, and the reflective polarizer 1033 operate differently.

Figure 10B:
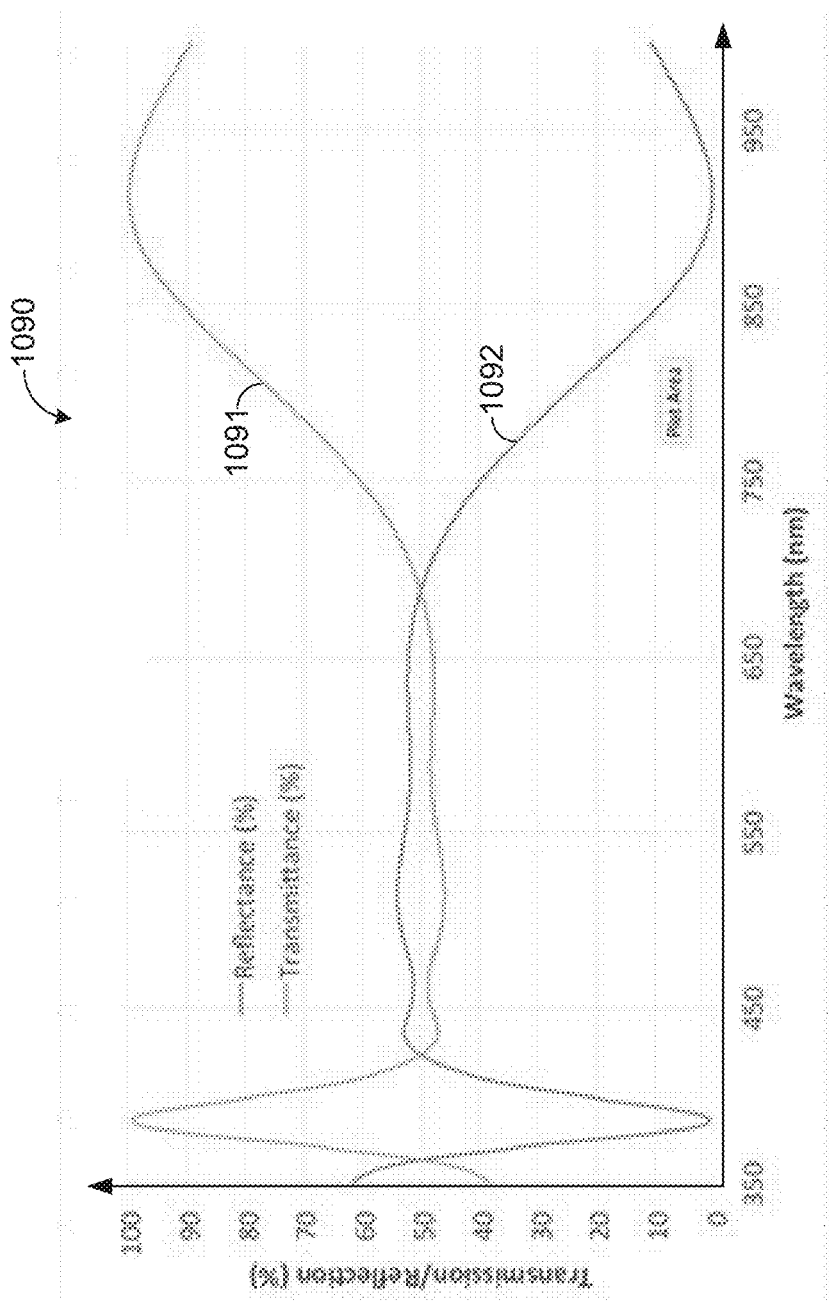
FIG. 10B is a plot of reflectance and transmittance versus wavelength for a partially reflective, partially transmissive surface.

In one embodiment, the light 1020 is unpolarized or randomly polarized. Thus, in various implementations, the PR/PT surface 1031 is partially reflective in the first wavelength range, but the PR/PT surface 1031 transmits, without substantial reflection, light 1020 in the second wavelength range. FIG. 10B illustrates a plot of the reflectance and transmittance versus wavelength for a PR/PT surface in accordance with some implementations. The plot 1090 illustrates that reflectance 1091 and the transmittance 1092 of the PR/PT surface is approximately 50% over a first wavelength range (e.g., between 450-650 nm), while the reflectance 1091 is between 0% and 10% and the transmittance 1092 is between 90% and 100% over a second wavelength range (e.g., between 850-950 nm).

Because the light 1020 is unpolarized, the quarter-wave retarder 1032 transmits, without substantial distortion, light 1020 in the second wavelength range without changing the polarization and the light 1020 remains unpolarized. The reflective polarizer 1033 reflects linearly polarized light of a first linear polarization and transmits linearly polarized light of a second linear orientation orthogonal to the first linear orientation in the first wavelength range, but the reflective polarizer 1033 transmits, without substantial distortion, light 1020 in the second wavelength range of any polarization. Accordingly, the light 1020 passes through the selectively distortive split meniscus lens 1030 without substantial distortion.

In one embodiment, the light 1020 provided by the one or more light sources 1022 is circularly polarized in the second circular orientation. Thus, in various implementations, the PR/PT surface 1031 is partially reflective in the first wavelength range, but the PR/PT surface 1031 transmits, without substantial reflection, light 1020 in the second wavelength range. As noted above, FIG. 10B illustrates a plot of the reflectance and transmittance versus wavelength for a PR/PT surface in accordance with some implementations.

The quarter-wave retarder 1032 changes linearly polarized light to circularly polarized light (and changes circularly polarized light into linearly polarized light) in the first wavelength range and the second wavelength range. Thus, the light 1020 passing through the quarter-wave retarder 1032 is linearly polarized in the second linear orientation. The reflective polarizer 1033 reflects linearly polarized light of a first linear polarization and transmits linearly polarized light of a second linear orientation orthogonal to the first linear orientation in the first wavelength wave and in the second wavelength. Thus, the light 1020, being linearly polarized in the second linear orientation after passing through the quarter wave retarder 1032, passes through the reflective polarizer 1033 the first time it encounters the reflective polarizer 1033.

The light 1020 then reflects off the eye of the user 10 and, still being linearly polarized in the second linear orientation, passes back through the reflective polarizer 1033, passes back through the quarter-wave retarder 1022 (thereby becoming circularly polarized), and passes through the PR/PT surface 1031 (which is fully transmissive in the second wavelength range). Accordingly, the light 1020 passes through the selectively distortive split meniscus lens 1030 without substantial distortion and without being reflected by the reflective polarizer 1033. The camera 1024 then detects the light 1020 that is circularly polarized in the second wavelength range that has been reflected by the eye of the user 10.

It is to be appreciated that the light path shown for the light 920 in FIG. 9 and the light path shown for the light 1020 can occur simultaneously. In various implementations, the difference in polarization state between the display light 920 and the eye tracking light 1020 and the resulting difference in interaction with the quarter wave retarder cause the light 920 from the display to be first reflected and then transmitted by the reflective polarizer 933, while the light 1020 from the one or more light sources is simply transmitted by the reflective polarizer 1033.

Figure 11A:
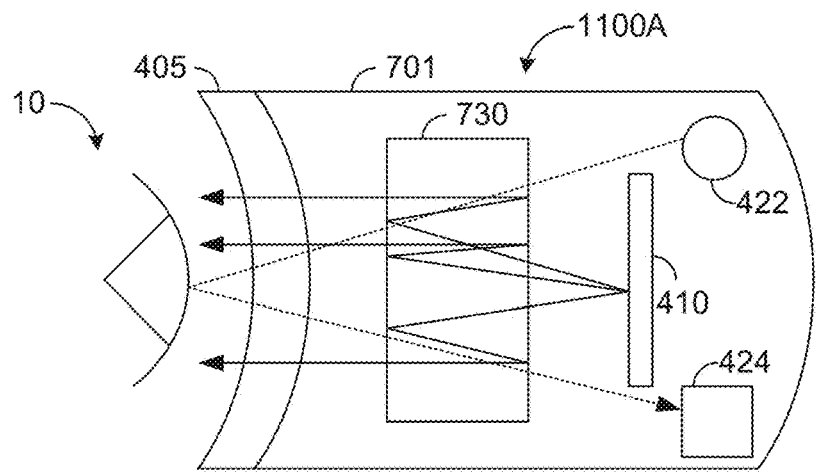
FIG. 11A illustrates a block diagram of a head-mounted device having a catadioptric eyepiece with an eye tracking system disposed behind the display in accordance with some implementations.

FIG. 11A illustrates a block diagram of a head-mounted device 1100A having a catadioptric eyepiece 1130 with an eye tracking system disposed behind the display 410 in accordance with some implementations. The head-mounted device 1100A of FIG. 11A is substantially similar to the head-mounted device 700 of FIG. 7, except that, in the head-mounted device 1100A of FIG. 11A, the one or more light sources 422 and the camera 424 are disposed at a distal (from the user 10) end of the housing, further from the eyepiece 730 than the display 410.

Figure 11B:
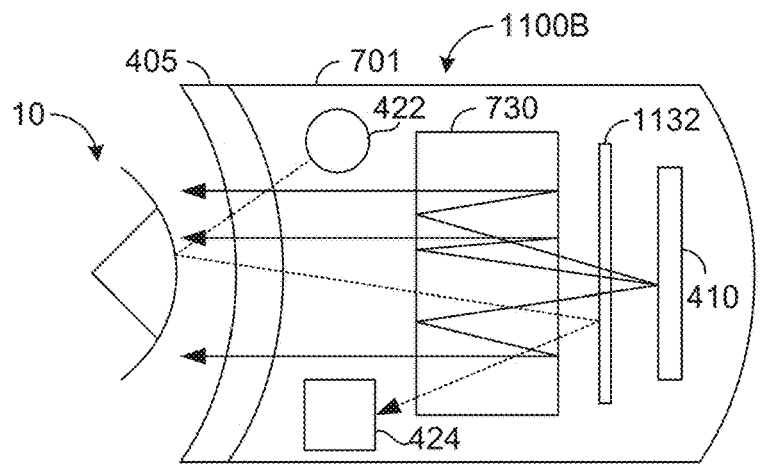
FIG. 11B illustrates a block diagram of a head-mounted device having a catadioptric eyepiece with an eye tracking system disposed in front of the eyepiece in accordance with some implementations.

FIG. 11B illustrates a block diagram of a head-mounted device 1100B having a catadioptric eyepiece 730 with an eye tracking system disposed in front of the eyepiece 730 in accordance with some implementations. The head-mounted device 1100B of FIG. 11B is substantially similar to the head-mounted device 700 of FIG. 7, except that, in the head-mounted device 1100B of FIG. 11B, the one or more light sources 422 and the camera 424 are disposed between the user 10 and the eyepiece 430. The camera 424 detects the light in the second wavelength range emitted by the light source after reflecting off a mirror 1132 that is reflective in the second wavelength range and transmissive in the first wavelength range. Alternatively, the mirror 1132 can be removed and the eyepiece 730 can include a PR/PT surface as described above that is fully reflective in the second wavelength range rather than fully transmissive.

Figure 11C:
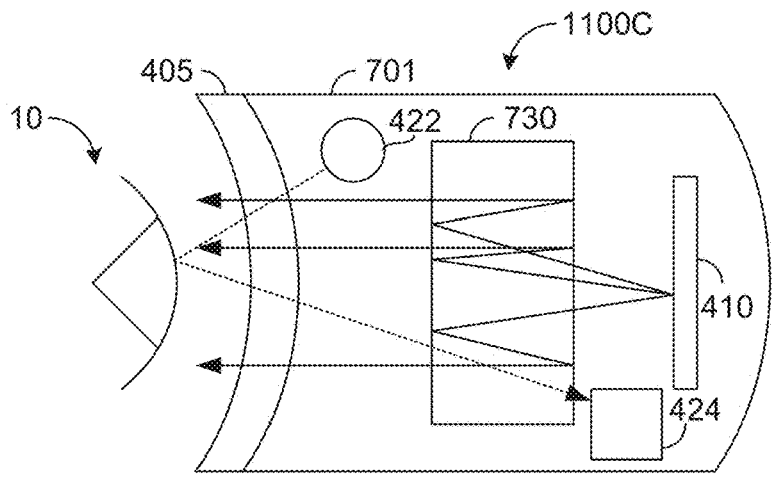
FIG. 11C illustrates a block diagram of a head-mounted device having a catadioptric eyepiece disposed between portions of an eye tracking system in accordance with some implementations.

FIG. 11C illustrates a block diagram of a head-mounted device 1100C having a catadioptric eyepiece 730 disposed between portions of an eye tracking system in accordance with some implementations. The head-mounted device 1100C of FIG. 11C is substantially similar to the head-mounted device 700 of FIG. 7, except that, in the head-mounted device 1100C of FIG. 11C, the one or more light sources 422 are disposed between the user 10 and the eyepiece and the camera 424 is disposed between the eyepiece 730 and the display 410.

Figure 12:
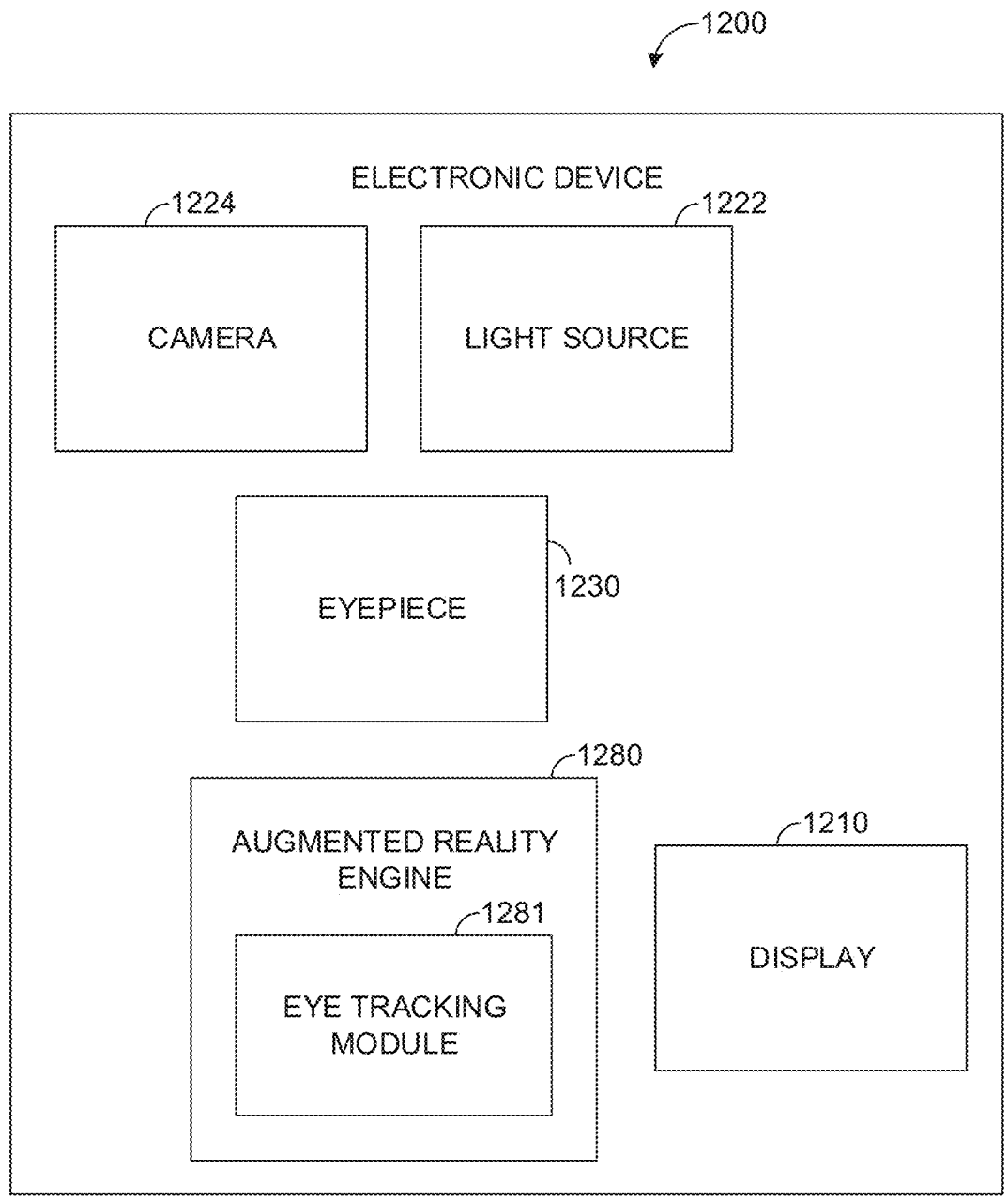
FIG. 12 illustrates a functional block diagram of an electronic device according to some implementations.

FIG. 12 illustrates a functional block diagram of an electronic device according to some implementations. The electronic device 1200 includes a display 1210 to emit light in a first wavelength range. The electronic device 1200 includes one or more light sources 1222 to emit light in a second wavelength range and a camera 1224 to detect light in the second wavelength range. In various implementations, the first wavelength range and the second wavelength range are non-overlapping. For example, in various implementations, the first wavelength range is a visible wavelength range and the second wavelength range is a near-infrared wavelength range. In various implementations, the first wavelength range and the second wavelength range are at least partially overlapping. In various implementations, the first wavelength range and the second wavelength range are substantially the same.

The electronic device 1200 includes an eyepiece 1230 to distort light in the first wavelength range. In various implementations, the eyepiece 1230 reflects and refracts light in the first wavelength range. In various implementations, the eyepiece 1230 passes, without substantially distortion, light in the second wavelength range. In various implementations, the eyepiece 1230 includes a catadioptric lens. In various implementations, the eyepiece 1230 includes a split meniscus lens. In various implementations, the eyepiece 1230 includes a 50/50 mirror, a quarter-wave retarder, and a reflective polarizer. In various implementations, the 50/50 mirror is substantially transparent in the second wavelength. In various implementations, the quarter-wave retarder is to change linearly polarized light into circularly polarized light in the first wavelength range and pass, without substantial distortion, unpolarized light in the second wavelength range. In various implementations, the one or more light sources 1222 are to emit circularly polarized light in the second wavelength range with a first circular orientation, the display 1210 is to emit circularly polarized light in the first wavelength range with a second circular orientation opposite to the first circular polarization, and the quarter-wave retarder is to change circularly polarized light to linearly polarized light in the first wavelength range and change circularly polarized light into linearly polarized light in the second wavelength range.

The electronic device 1200 includes an augmented reality engine 1280 (which, in various implementations, is a processor executing an augmented reality module) that provides data to the display indicating an image to be presented on the display 1210. The augmented reality engine 1280 includes an eye tracking module 1281 to track a gaze direction of a user of the electronic device 1200 based on the light in the second wavelength range detected by the camera 1224. In various implementations, the one or more light sources project a series of bright spots or glints onto the eye of a user so that the relative position or gaze direction of the user's eye can be tracked.

In various implementations, similar to the head-mounted device 700 of FIG. 7, the camera 1224 is disposed between the eyepiece 1230 and the display 1210. In various implementations, similar to the head-mounted device 1100A of FIG. 11A, the display 1210 is disposed between the eyepiece 1230 and the camera 1224. In various implementations, similar to the head-mounted device 1100B of FIG. 11B, the eyepiece 1230 is disposed between the camera 1224 and the display 1210.

In various implementations, similar to the head-mounted device 700 of FIG. 7, the one or more light sources 1222 are disposed between the eyepiece 1230 and the display 1210. In various implementations, similar to the head-mounted device 1100A of FIG. 11A, the display 1210 is disposed between the eyepiece 1230 and the one or more light sources 1222. In various implementations, similar to the head-mounted device 1100B of FIG. 11B, the eyepiece 1230 is disposed between the one or more light sources 1222 and the display 1210.

In various implementations, the display 1210 is disposed less than five millimeters from the eyepiece 1230, but the eyepiece 1230 provides a virtual distance of at least half a meter. In various implementations, the display 1210 is disposed less than five millimeters from the eyepiece 1230, but the eyepiece 1230 provides a virtual distance of at one meter. In various implementations, the one or more light sources 1222 are disposed less than thirty millimeters from the eye of the user. However, by placing the one or more light sources 1222 between the eyepiece 1230 and the display 1210, the one or more light sources 422 are disposed closer to the optical axis, thereby improving detectability by the camera 424 and localization by the eye tracking system.

Figure 13:
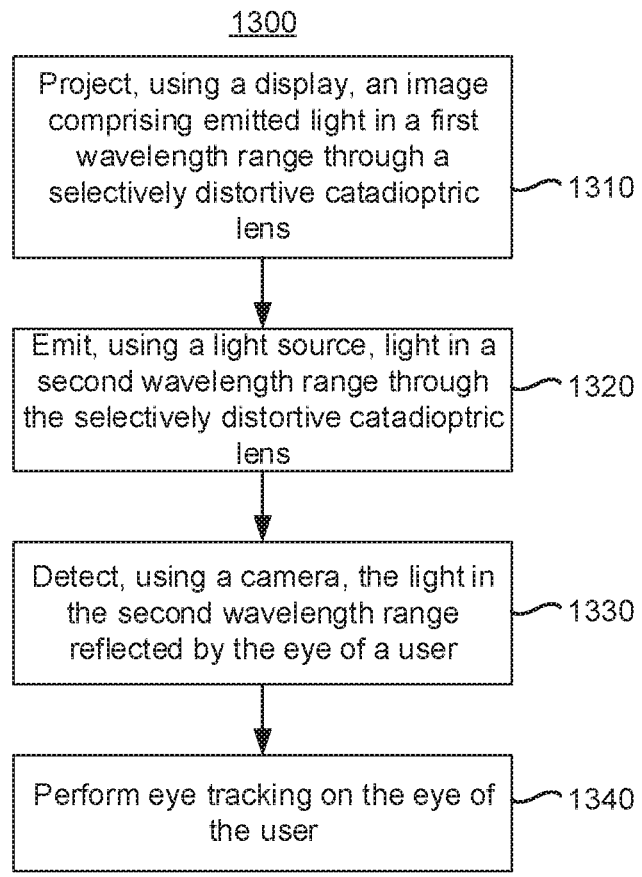
FIG. 13 is a flowchart representation of a method of image display and eye tracking in accordance with some implementations.

FIG. 13 is a flowchart representation of a method 1300 of image display and eye tracking in accordance with some implementations. In various implementations (and as described below as an example), the method 1300 is performed by a head-mounted device, such as the HMD 1200 of FIG. 12. In various implementations, the method 1200 is performed by a device with one or more processors, non-transitory memory, and one or more AR/VR displays (e.g., the HMD 120 of FIG. 3). In some implementations, the method 1300 is performed by processing logic, including hardware, firmware, software, or a combination thereof. In some implementations, the method 1300 is performed by a processor executing code stored in a non-transitory computer-readable medium (e.g., a memory).

The method 1300 begins, at block 1310, with the HMD projecting, using a display, an image comprising emitted light in a first wavelength through a selectively distortive catadioptric lens. Thus, in some implementations, the HMD projects, using a display, an image comprising emitted light in a first wavelength range through an eyepiece that distorts light in the first wavelength range. In some implementations, the HMD projects, using a display, an image comprising emitted light in a first wavelength through an eyepiece that reflects and refracts light in the first wavelength range while passing, without substantial distortion, light in a second wavelength range.

The method 1300 continues, at block 1320, with the HMD emitting, using one or more light sources, light in the second wavelength range through the selectively distortive catadioptric lens. Thus, in some implementations, the HMD emits, using one or more light sources disposed between the eyepiece and the display, light in the second wavelength range. In some implementations, the HMD emitting, using one or more light sources, light in the second wavelength range through the eyepiece.

The method continues 1300, at block 1330, with the HMD detecting, using a camera, the light in the light in the second wavelength range reflected by the eye of a user.

The method continues 1300, at block 1340, with the HMD performing eye tracking on the eye of the user based on the detected light in the second wavelength range reflected by the eye of the user. For example, in various implementations, the HMD performs eye tracking by determining a gaze direction of the user based on the detected light in the second wavelength range reflected by the eye of the user and the relative position of the user's eye.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. An apparatus comprising:
   a display to emit light in a first wavelength range;
   one or more light sources to emit light in a second wavelength range;
   a camera to detect the light in the second wavelength range; and
   an eyepiece to reflect and refract the light in the first wavelength range while passing, without substantial refraction, the light in the second wavelength range, wherein the eyepiece includes two lens halves separated by a retarder that changes linearly polarized light to circularly polarized light in the first wavelength range and passes, without substantial refraction, the light in the second wavelength range.

2. The apparatus of claim 1, wherein the first wavelength range is a visible wavelength range and the second wavelength range is a near-infrared wavelength range.

3. The apparatus of claim 1, wherein the camera is disposed between the eyepiece and the display.

4. The apparatus of claim 1, wherein the display is disposed between the eyepiece and the camera.

5. The apparatus of claim 1, wherein the eyepiece is disposed between the camera and the display.

6. The apparatus of claim 1, wherein the display is disposed less than five millimeters from the eyepiece, wherein the eyepiece provides a virtual distance of at least one meter.

7. The apparatus of claim 1, wherein the eyepiece includes a catadioptric lens.

8. The apparatus of claim 1, wherein the two lens halves of the eyepiece correspond to a split meniscus lens.

9. The apparatus of claim 8, wherein the eyepiece includes a 50/50 mirror and a reflective polarizer, and wherein the retarder corresponds to a quarter wave retarder.

10. The apparatus of claim 9, wherein the one or more light sources emit unpolarized light.

11. The apparatus of claim 9, wherein the one or more light sources to emit circularly polarized light in the second wavelength range with a first circular orientation,
    wherein the display emits circularly polarized light in the first wavelength range with a second circular orientation opposite the first circular polarization, and
    wherein the quarter-wave retarder changes circularly polarized light to linearly polarized light in the first wavelength range and changes circularly polarized light to linearly polarized light in the second wavelength range.

12. The apparatus of claim 9, wherein the 50/50 mirror is substantially transparent in the second wavelength range.

13. The apparatus of claim 1, wherein the camera detects the light in the second wavelength range having been reflected off an eye of a user and passed through the eyepiece without substantial refraction.

14. An apparatus comprising:
a selectively distortive catadioptric eyepiece including two lens halves separated by a retarder;
a display to emit light in a first wavelength range through the selectively distortive catadioptric eyepiece, wherein the light in the first wavelength range is reflected and refracted by the selectively distortive catadioptric eyepiece, and wherein the retarder changes linearly polarized light to circularly polarized light in the first wavelength;
one or more light sources to emit light in a second wavelength range through the selectively distortive catadioptric eyepiece, wherein the light in the second wavelength range is passed, without substantial refraction, by the selectively distortive catadioptric eyepiece, and wherein the retarder passes, without substantial refraction, the light in the second wavelength range; and
a camera to detect the light in the second wavelength range that is reflected by an eye of a user.

15. The apparatus of claim 14, wherein the first wavelength range is a visible wavelength range and the second wavelength range is a near-infrared wavelength range.

16. The apparatus of claim 14, wherein the one or more light sources project a circle of glints onto the eye of a user.

17. The apparatus of claim 14, further comprising a processor to track a gaze direction of the user based on the light in the second wavelength range that is reflected by the eye of the user.

18. The apparatus of claim 14, wherein the one or more light sources are disposed less than thirty millimeters from the eye of the user.

19. The apparatus of claim 14, wherein the selectively distortive catadioptric eyepiece includes a 50/50 mirror and a reflective polarizer, and wherein the retarder corresponds to a quarter wave retarder.

20. The apparatus of claim 14, wherein the camera is hidden from a view of the user.

21. A method comprising:
projecting, using a display, an image comprising emitted light in a first wavelength through an eyepiece that reflects and refracts light in the first wavelength range while passing, without substantial refraction, light in a second wavelength range, wherein the eyepiece includes two lens halves separated by a retarder that changes linearly polarized light to circularly polarized light in the first wavelength range and passes, without substantial refraction, the light in the second wavelength range;
emitting, using one or more light sources, light in the second wavelength range through the eyepiece; and
detecting, using a camera, the light in the second wavelength range reflected by an eye of a user.

22. The method of claim 21, wherein the one or more light sources emit the light in the second wavelength in a first direction, and wherein the camera detects the light in the second wavelength reflected by the eye of the user that passes through the eyepiece in a second direction opposite the first direction.

* * * * *